(12) United States Patent
DeLong

(10) Patent No.: US 6,304,799 B1
(45) Date of Patent: Oct. 16, 2001

(54) APPARATUS AND METHOD FOR LASERCOM TRACKING ACQUISITION

(75) Inventor: Raymond K. DeLong, Palos Verdes Estates, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/510,625

(22) Filed: Feb. 22, 2000

(51) Int. Cl.[7] .................................................. B64G 1/36
(52) U.S. Cl. ........................ 701/13; 701/222; 244/165
(58) Field of Search .................................. 701/13, 4, 17, 701/213, 222, 223, 300; 244/164, 171, 165, 168; 455/12.1, 13.2; 356/139.01

(56) References Cited

U.S. PATENT DOCUMENTS

| | | | |
|---|---|---|---|
| 4,426,052 | * | 1/1984 | Hubert et al. ................ 244/168 |
| 5,808,732 | * | 9/1998 | Williams ..................... 356/139.01 |
| 6,108,594 | * | 8/2000 | Didinsky et al. ............. 701/13 |
| 6,158,694 | * | 12/2000 | Gowrinathan ................ 244/171 |

* cited by examiner

*Primary Examiner*—Tan Nguyen
(74) *Attorney, Agent, or Firm*—Connie M. Thousand

(57) ABSTRACT

An apparatus for determining the pointing uncertainty of a satellite communications system comprises a communications terminal coupled to a pointing mechanism which is operative to move and position the communications mechanism. A data storage device is configured to store data from which an actual position of a preselected light source which radiates a reference light can be determined. An acquisition sensor is positioned to move with the communications terminal and is configured to focus incident light onto the acquisition sensor. A control mechanism is coupled to the pointing mechanism and is operative to move the pointing mechanism to a position which would focus the reference light source at a preselected position on the acquisition sensor if the pointing uncertainty were substantially zero. The reference light focusing at a measured position on the acquisition sensor. A processor is coupled to the acquisition sensor and is operative to calculate the difference between the preselected position and the measured position, whereby the pointing uncertainty is calculable from the difference.

18 Claims, 2 Drawing Sheets

APPARATUS AND METHOD FOR LASERCOM TRACKING ACQUISITION

BACKGROUND OF THE INVENTION

The present invention relates generally to lasercom acquisition and tracking systems and more particularly to an apparatus an method for determining a pointing uncertainty of a satellite communications systems.

Space based communications systems are mounted on spacecraft and provide communications between two terminals on separate spacecraft. For high data rate transfers, some spacecraft systems use Laser signals for communications, herein referred to as Lasercom. Lasercom communications beams are typically very narrow and as such, must be precisely directed towards the opposing terminal to communicate. Factors such as uncertainty in attitude and position of the terminals as well as the uncertainty of the attitude and position of each spacecraft itself can result in the Lasercom signal being mispointed. To solve this problem, each satellite which has a Lasercom system typically provides hardware and software which enables one satellite to acquire the opposing terminal.

One method used to acquire the opposing satellite in a lasercom system is to provide a separate mechanism on one spacecraft which is used for acquiring the opposing spacecraft. To do so, a beacon having a beamwidth which is as broad as the pointing uncertainty is mounted on each spacecraft. In addition, a sensor having a field-of-view which encompasses thehhe field-of-view increases. As such, the beamwidth of the beeeacon and the sensor must be increased to cover the wider field-of-view. This is undesirable since a wider beamwidth beacon requires additional power which is a scarce commodity on a spacecraft.

Another method used to acquired an opposing satellite in a lasercom system is to mount a beacon having a narrow beamwidth and a sensor having a wide field-of-view on one spacecraft. The narrow beacon is scanned in the vicinity of the opposing satellite and eventually, the opposing terminal is acquired. This is referred to as the narrow beacon approach. A downfall of this approach is that the field-of-view which must be scanned increases with an increase in the uncertainty. As such, as the uncertainty increases, the field-of-view which must be scanned increases in an amount proportional to the uncertainty squared since the field-of-view which must be scanned is a two dimensional grid with each dimension increasing in size an amount equal to the uncertainty. This increased scan area means that the amount of time required for acquiring increases. This increase time to acquire can cause problems for some communications systems since the time devoted to scanning and acquiring is time away from the communications function. This can typically be tolerated if acquisition is only required once in a satellites service life, such as in a geosychronous system where the satellites move together and acquisition is typically only required at the beginning of the mission. However, in a system where acquisition is required more often, such as in a non-geosychronous communications system where satellites are moving with respect to each other and move into an out of each other's view as often as once every ½ hour, a long acquisition time can be tolerated. In such a system, each time a satellite moves out of and then back into the view of the acquiring satellite, reacquisition must take place. The scanning process requires several minutes of missed communications for each and every reacquisition which is unacceptable for most communications systems. Since continuous or virtually continuous communications are desirable for many system, it is important to reduce the amount of time needed for acquisition in a lasercom system.

What is need therefore is an apparatus and a method which reduces the field-of-view which must be scanned to acquire an opposing terminal and does not require a wide field-of-view sensor.

SUMMARY OF THE INVENTION

The proceeding and downfalls of the prior art are addresses by the present invention which provides, in a first aspect, an apparatus for determining the pointing uncertainty of a satellite communications system. The apparatus comprises a communications terminal coupled to a pointing mechanism which is operative to move and point the communications mechanism. An acquisition sensor is configured to move with the communications terminal and is configured so that an incident light signal will focus on the acquisition sensor.

A data storage device is configured to store data from which an actual position of a preselected light source which radiates a reference light can be determined. A control mechanism is coupled to the pointing mechanism and is operative to move the pointing mechanism to an angle which would focus the reference light source at a preselected position on the acquisition sensor if the pointing uncertainty were substantially zero, whereby the reference light focuses at a measured position on the acquisition sensor.

A processor is coupled to the acquisition sensor and is operative to calculate the difference between the preselected position and the measured position, whereby the pointing uncertainty is calculable from the difference.

In a second aspect, the present invention provides a method for determining an initial pointing uncertainty in a satellite communications system having a communications terminal which is pointed by a pointing mechanism. Actual angles for a reference source which radiates a reference light is determined. A sensor is mounted to the satellite in a preselected position so that that sensor is moveable with the communications terminal.

The communications terminal and the sensor are pointed to a position which would focus the reference light onto a preselected position on the sensor if the initial pointing uncertainty were substantially zero. The reference light is focused onto the sensor at a measured position and, the initial pointing uncertainty is calculated from the measured position and the actual position.

In a third aspect, the present invention provides a method for acquiring an opposing terminal having a reference position in a satellite communications system having a communications terminal which is pointed by a pointing mechanism. An actual position for a reference source which radiates a reference light is determined. A sensor is mounted to the satellite in a preselected position so that that sensor is moveable with the communications terminal.

The communications terminal and the sensor are pointed to a position which would focus the reference light onto a preselected position on the sensor if the initial pointing uncertainty were substantially zero. The reference light is focused onto the sensor at a measured position and, the initial pointing uncertainty is calculated from the measured position and the actual position. The reference position of the opposing terminal together with the calculated initial pointing uncertainty are used to point the communications terminal towards the opposing terminal, and, the communications beam is scanned over a preselected field-of-view until the opposing terminal is acquired.

DESCRIPTION OF THE PREFERRED EMBODIMENTS

Figure 1:
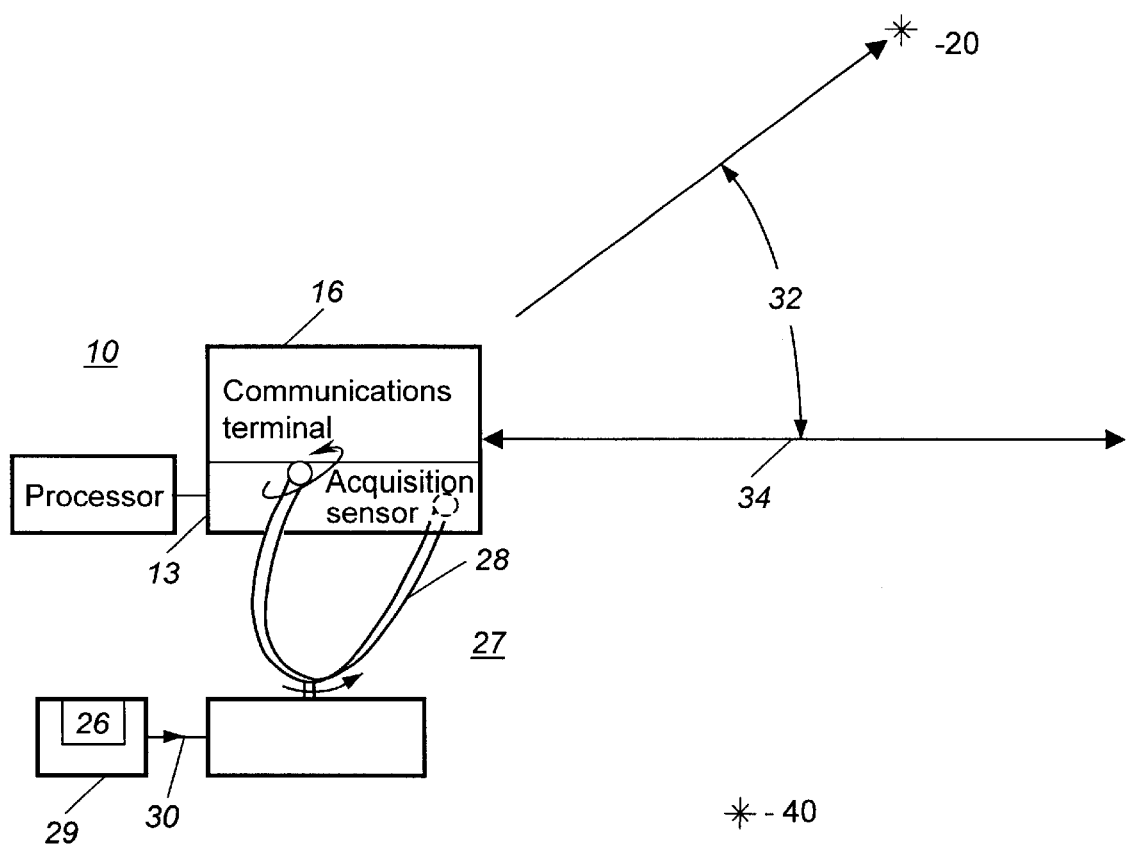
FIG. 1 is a block diagram depicting a communications and acquisition system which provides a novel approach to Lasercom acquisition in accordance with the present invention; and, FIG. 2 is a schematic drawing depicting a satellite communications system in which the present invention may be used.
Figure 2:
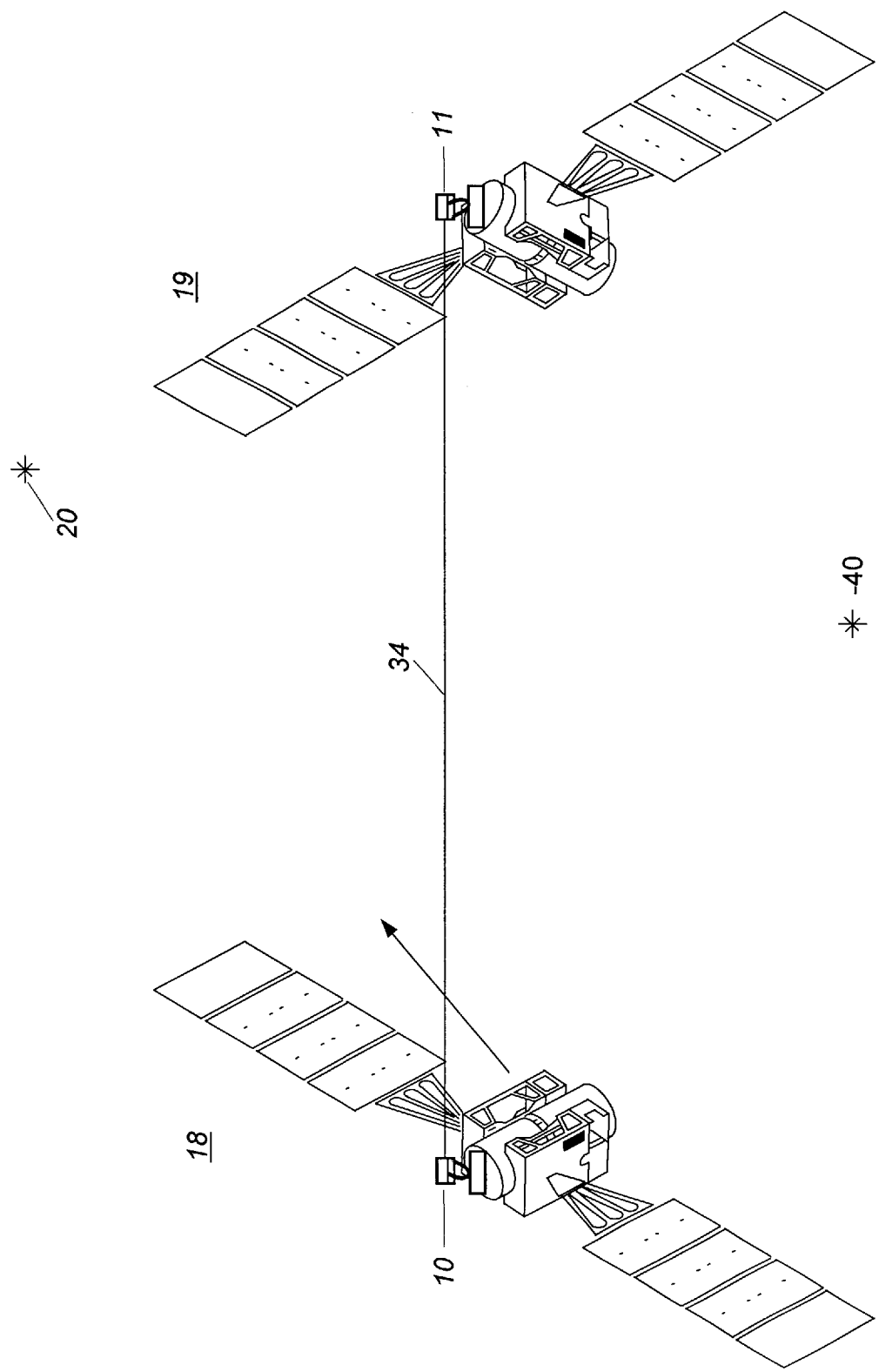

Referring to FIGS. 1 and 2, the present invention provides a communications and acquisition apparatus 10 for acquiring an opposing terminal 11 and communicating with the opposing terminal 11. The communications apparatus 10 includes an acquisition sensor 13, which is operative to acquire the opposing terminal 11; and, a communications terminal 16 which is operative to communicate with the opposing terminal 11. The apparatus 10 is preferably mounted to a spacecraft 18 and is operative to decrease the uncertainty in pointing the communications terminal 16 towards the opposing terminal 11 so that the field-of-view over which the communications terminal 16 must scan to acquire and communicate with the opposing terminal 11 is reduced thereby reducing the time required for acquisition. The apparatus 10 is particularly applicable in systems which use laser beams for communications between spacecraft 18, 19, herein referred to as a Lasercom communications system.

Spacecraft 18, 19 which intend to communicate with each other are typically programmed with information indicating the position of the spacecraft 18, 19 with respect to each other. As such, if uncertainties do not exist in either spacecraft 18, 19, the beam from the communications terminal 16 can be pointed directly at the opposing terminal 11 and communications can commence. Unfortunately, uncertainties exist which result in the communications beam from the communications terminal 16 being mispointed. The present invention provides an apparatus 10 and a method for reducing the amount of the pointing uncertainty of the communications terminal 16 by measuring the position of a fixed, known reference source 20, and using that measurement to correct for the pointing uncertainty.

The first step in the process is to select a fixed, known reference source 20 and place data from which the known position of the reference source can be determined in a data storage device 26. The position of the source 20 should be known and substantially fixed. As such, it is preferred that a star 20 be used as the reference source since the positions of many stars are well known. An additional advantage of using a star is that stars are already present in space. As such, using a star 20 as the fixed reference source takes advantage of an already present naturally occurring reference source. Any star 20 which radiates light and has a substantially known position can be selected. Data which indicates the position of the selected star 20 is preferably stored in a data storage device 26 located on the host spacecraft 18 but can alternatively be located in a ground terminal (not shown).

The next step in the process is to configure the communications terminal 16 and the acquisition sensor 13 to move together and be pointable to a preselected location. To do so, the communications terminal 16 is mounted on a pointing mechanism 27, which preferably includes a gimbal mechanism 27. It is preferred that the acquisition sensor 13 be mounted directly to the communications terminal 16 but can also be mounted on the moveable yolk section 28 of the gimbal 27 or on any other component or structure which moves with the communications terminal 16. The acquisition sensor 13 can alternatively be mounted on a separate gimbal mechanism, however, this would require the additional weight of another pointing mechanism and the added complication of calibrating the sensor 13 to the communications terminal 16. As such, it is preferred that the communications terminal 16 and the acquisition sensor 13 be coupled together and moved together with a single gimbal mechanism 27.

The next step in the process is to calculate the amount of the pointing uncertainty. To do so, the gimbal 27 is moved to a position which would focus the reference light signal at an expected location on the sensor 13 if no uncertainty existed in the communications terminal 16. The gimbal 27 is coupled to a controller 29 which provides a control signal 30 to the gimbal 27. The gimbal 27 is responsive to the control signal 30 and is operative to move either a preselected amount or to a preselected position in response to the control signal 30 to point the acquisition sensor 13 in the proper direction so that the light radiating from the reference star 20 is focused onto the sensor 13.

The expected location at which the reference light is focused on the sensor 13 is determined from the known reference position of the star 20. Since uncertainties exist, the star light will focus on the acquisition sensor 13 at a measured location which is different than the expected location. The sensor 13 can be any sensor known to one skilled in the art to measure the position of a light source 20 but preferably includes an optical member and a sensor array which are configured so that a light signal originating from a location and illuminating the optical member at an angle will be focused on the sensor array at a position corresponding to the angle of illumination. The type of sensor 13 and material for the sensor 13 are selected so as to be responsive to star light. Selecting a star 20 for the reference source allows for a variety of sensor choices since advantage can be taken of the stars spectral broadness. Silicon and InGaAs are two possible materials for the sensor 13 and, since the sensor 13 is pointed at the star 20 by the gimbal 27 or a pointing mirror, a nulling sensor such as a quad cell could be used as well as two dimensional array such as a charge coupled device (CCD). Using a CCD for the sensor 13 minimizes the expense of the apparatus 10 since a CCD is typically inexpensive and does not require a significant number of optical devices or extensive data processing to measure the incoming angle or location of a light source 20. The CCD is preferably mounted onto the side of the communications terminal 16 and the line of sight of the CCD is coaligned with the line of sight of the communications terminal 16. The accuracy of the alignment between the CCD and the communications terminal 16 is not critical since the intent of the present invention is to simply reduce the amount of the uncertainty so that acquisition can proceed more quickly. Even a non-perfect alignment would reduce the uncertainty from a large amount, such as 5 milliradians, to a tolerable uncertainty such as a 0.5 milliradian, and, since the area which must be scanned to acquire the opposing satellite 19 is a function of the uncertainty squared, even a non-perfect alignment would reduce the scanning area from, for example, 25 sq. milliradians to 0.25 sq. milliradians.

The difference between the measured location of the focused starlight and the expected location provides sufficient data to compute the amount of the pointing uncertainty. Once the difference between the measured position and the actual position is known, the amount of the uncertainty is known and the angle 32 between the star 20 and the line-of-sight 34 of the opposing terminal 11 can be calculated. The gimbal 27 can then be commanded to move the calculated angle 32 so as to initially point the communications terminal 16 towards the opposing terminal 11 in a direction which is much closer to the opposing terminal 11 than the communications terminal 16 would be pointed absent the uncertainty measurement. Thus, by obtaining knowledge of the uncertainty, the mispointing can be reduced.

For the preferred embodiment of the invention, the process further includes measuring a second star 40 and using that measurement to further refine the pointing of the communications terminal 16. Using a single star 20 for the reference source is acceptable if the uncertainty in the communications terminal 16 is not too great and there is an acceptable known star 20 reasonably close in angular distance. In such a situation, as soon as the reference star 20 is acquired and measured, the communications terminal 16 can be repointed to acquire the opposing terminal 11. Note that if the host satellite 18 has significant attitude rate uncertainty, the reference star 20 is tracked for a sufficient time to reduce the rate uncertainty to an acceptable level.

However, if the host satellite 18 has a significant amount of attitude uncertainty, measuring a single star 20 alone will not provide enough information to repoint the communications terminal 16 since measuring a single star 20 will provide only two angular measurement where three angular measurements must be made to adequately compensate for the attitude uncertainty. To obtain three angular measurement, the position a second star 40 is measured and the actual position of the second star 40 is compared to the measured position of the second star 40 in the same manner as described above. The second star 40 is selected to be separated from the first star 20 by a reasonable angular amount. Measuring two stars 20, 40 spaced at least preferably 30 degrees apart will provide information for three angular degrees of freedom, and, spaced substantially 90 degrees apart will produce the best accuracy.

Using the data obtained from measuring both the first 20 star and second 30 stars to point the communications terminal 16 in effect calibrates the on-board reference system for those errors which are attributable to the on-board reference system. As such, the attitude reference error of the communications terminal 16 is calibrated out. However, other errors can still exist which may result in the communications terminal 16 and the opposing terminal 11 being misaligned. As such, the next step in the process is to scan a preselected field-of-view to acquire the opposing terminal 11. As previously mentioned, the field-of-view over which the beam from the communications terminal 16 must be scanned is proportional to the square of the uncertainty amount, which has been reduced by the measurement process detailed above. Thus, the field-of-view over which the beam from the communications terminal 16 must be scanned to acquire the opposing terminal 11 is greatly reduced when compared to the field-of-view which must be scanned absent the knowledge of the uncertainty.

As is apparent from the above discussion, the present invention in effect uses the narrow beacon approach but uses information gained from measuring fixed, known stars to reduce the field-of-view or area over which the communications terminal must scan to acquire the opposing terminal. For a satellite platform which is stable and has some uncertainty, the present invention can be used to quickly reduce the pointing uncertainty and reduce the amount of time required for acquisition from, for example, 30 minutes to between 10 and 30 seconds thereby greatly lowering the amount of time required for acquisition.

The main objective of the present invention is to reduce the amount of the uncertainty so that the field-of-view over which the communications terminal 16 must be scanned is reduced, as such, the measurement of the uncertainty does not have to be perfect or even very accurate and can still reduce the uncertainty. As such, even a low sensitivity, inexpensive sensor such as a CCD can be used and will provide sufficient information to at least lower the uncertainty below that which was present prior to using the above method and apparatus.

The present apparatus and method significantly decreases the area to be scanned reducing the acquisition time, does not require a separate beacon on the spacecraft, and can be accomplished with a relatively inexpensive acquisition sensor thereby saving weight, cost and time. The present invention also takes advantage of the already present stars and the availability of relatively cheap sensors such that the present invention in effect is operative to calibrate the on-board reference system with an inexpensive visible sensor and the stars. It will be appreciated by persons skilled in the art that the present invention is not limited to what has been shown and described hereinabove. The scope of the invention is limited solely by the claims which follow.

What is claimed is:

1. An apparatus for determining an initial pointing uncertainty of a communications beam in a satellite communications system comprising:

a communications terminal which generates said communications beam;

a pointing mechanism coupled to said communications mechanism and operative to move and point said communications mechanism;

a data storage device configured to store data from which an actual position of a preselected light source which radiates a reference light is capable of being determined;

an acquisition sensor configured to move with said communications terminal said communications terminal configured to focus said reference light onto the acquisition sensor;

a control mechanism coupled to said pointing mechanism and operative to move said pointing mechanism to a position which would focus the reference light at a preselected position onto said acquisition sensor upon said initial pointing uncertainly being substantially zero, said reference light focusing at a measured position on said acquisition sensor; and, a processor coupled to said acquisition sensor and operative to calculate a difference between said preselected position and said measured position, said pointing uncertainty can be determined from said difference.

2. The apparatus of claim 1, wherein said preselected light source is a preselected star.

3. The apparatus of claim 2, wherein said pointing mechanism comprises a gimbal.

4. The apparatus of claim 3, wherein said acquisition sensor is mounted on said gimbal.

5. The apparatus of claim 2, wherein said data storage device is configured to store data from which an actual position of a first and a second prestively, is capable of being determined, said control mechanism operative to move said pointing mechanism to a first position which would focus the first reference light at a preselected first position on said acquisition sensor upon said initial pointing uncertainty being substantially zero, said first reference light focusing at a first measured position on said acquisition sensor, said control mechanism operative to move said pointing mechanism to a second position which would focus the second reference light at a preselected second position on said acquisition sensor upon said initial pointing uncertainty being substantially zero, said second reference light focusing at a second measured position on said acquisition sensor, and, said processor operative to calculate a first difference between said preselected first position and said measured first position and a second difference between said preselected second position and said measured second position, said first and second differences together provide data from which said initial pointing uncertainty is determined.

6. The apparatus of claim 5, wherein said first and second reference sources are first and second stars.

7. The apparatus of claim 6, wherein said first and second stars are spaced substantially 90 degrees apart.

8. The apparatus of claim 2, wherein said acquisition sensor is a charge coupled device.

9. A method for determining an initial pointing uncertainty in a satellite communications system having a host satellite comprising a communication terminal which provides a communications beam and is pointed by a pointing mechanism comprising the steps of:

determining an actual position for a first reference source which radiates a first reference light;

mounting a sensor onto said host satellite in a preselected position so that said sensor is movable with said communications terminal;

moving said communications terminal and said sensor to a position which would focus the light from the reference source onto a preselected position on said sensor upon said initial pointing uncertainty being substantially zero;

focusing said light from said reference source onto said sensor at a measured position; and, calculating the initial pointing uncertainty from the measured position and the actual position.

10. The method of claim 9, wherein determining an actual position for a first reference source which radiates a reference light comprises determining an actual position for a reference star which radiates a reference light.

11. The method of claim 10, wherein mounting a sensor onto said satellite in a preselected position so that said sensor is movable with said communications terminal comprises mounting a sensor onto said pointing mechanism so that said sensor is movable with said communications terminal.

12. The method of claim 11, wherein mounting a sensor comprises mounting a charge coupled device onto said pointing mechanism.

13. The method of claim 10, further comprising:

determining an actual position for a second reference source which radiates a second reference light;

moving said communications terminal and said sensor to a position which would focus the second reference light onto a preselected second position on said sensor upon said initial pointing uncertainty being substantially zero; and, focusing said second reference light onto said sensor at a second measured position, and wherein calculating the initial pointing uncertainty from the measured position and the actual position comprises calculating the initial pointing uncertainty from the first and second measured positions and the first and second actual positions.

14. A method for acquiring an opposing terminal having an initial reference position, in a lasercom communications system having a host satellite comprising a communications terminal an initial pointing uncertainty, said host terminal positionable with a pointing mechanism comprising the steps of:

determining an actual position for a first reference source which radiates a first reference light;

mounting a sensor onto said host satellite in a preselected position so that said sensor is movable with said communications terminal;

moving said communications terminal and said sensor to a position which would focus the light from the reference source onto a preselected position on said sensor upon said initial pointing uncertainty being substantially zero;

focusing said light from said reference source onto said sensor at a measured position;

calculating the initial pointing uncertainty from the measured position and the actual position;

calculating a new reference position for said opposing terminal corrected for said calculated initial pointing uncertainty;

pointing said communications terminal towards said new reference position; and, scanning said acquisition sensor over a preselected area until said opposing terminal is acquired.

15. The method of claim 14, wherein determining an actual position for a first reference source which radiates a reference light comprises determining an actual position for a reference star which radiates a first reference light.

16. The method of claim 15, wherein mounting a sensor onto said satellite in a preselected position so that said sensor is movable with said communications terminal comprises mounting a sensor onto said pointing mechanism so that said sensor is movable with said communications terminal.

17. The method of claim 16, wherein mounting a sensor comprises mounting a charge coupled device onto said pointing mechanism.

18. The method of claim 14, further comprising:

determining an actual position for a second reference source which radiates a second reference light;

moving said communications terminal and said sensor to a position which would focus the second reference light onto a preselected second position on said sensor if said initial pointing uncertainty were substantially zero;

focusing said second reference light onto said sensor at a second measured position; and, calculating the initial pointing uncertainty from the first and second measured positions and the first and second actual positions.

* * * * *